Sept. 8, 1970    R. T. BEAZLEY ET AL    3,526,940
METHOD OF MANUFACTURING A JOINT OF THE BALL AND SOCKET TYPE Filed June 26, 1968    2 Sheets-Sheet 1

INVENTOR
RODNEY THOMAS BEAZLEY
DENNIS THORNTON
BY
ATTORNEYS

Sept. 8, 1970    R. T. BEAZLEY ET AL    3,526,940
METHOD OF MANUFACTURING A JOINT OF THE BALL AND SOCKET TYPE
Filed June 26, 1968    2 Sheets-Sheet 2

INVENTOR
RODNEY THOMAS BEAZLEY.
DENNIS THORNTON
BY
ATTORNEYS

United States Patent Office 3,526,940
Patented Sept. 8, 1970

3,526,940
METHOD OF MANUFACTURING A JOINT OF THE BALL AND SOCKET TYPE
Rodney Thomas Beazley, Maidstone, and Dennis Thornton, Doncaster, England, assignors to The Glacier Metal Company Limited, Alperton, Wembley, England
Filed June 26, 1968, Ser. No. 740,263
Int. Cl. B23p 11/00
U.S. Cl. 29—149.5                                      6 Claims

ABSTRACT OF THE DISCLOSURE

A method of making a ball and socket joint comprising locating a ball member in a cylindrical blank slotted from end to end which is compressed axially to form an annular outer member constituting the socket, the mean circumferential length of which is then extended by rolling to provide a working clearance between the ball mmeber and the socket.

---

Figure 1:
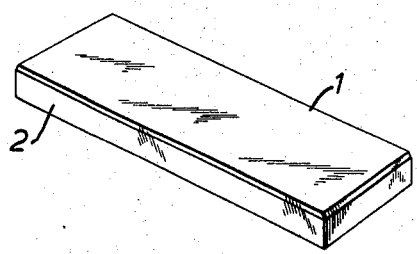

This invention relates to a method of making bearing assemblies of the kind usually and hereinafter called ball and socket joints.

The term "ball and socket joint" is used herein for convenience to mean any bearing assembly comprising an inner member constituting the ball an annular bearing surface which is of circular cross-section in planes at right angles to an axis about which said surface is symmetrical and which, in planes containing that axis is of curved convex form such that the annular bearing surface has its largest diameter at an intermediate point in its length, and an annular outer member constituting the socket surrounding the inner member and with its inner surface constituting an annular bearing surface in sliding engagement with the annular bearing surface of the outer member. The inner member of such bearing assemblies usually has a shank or pair of co-axial shanks projecting radially from it or is provided with a bore through which such a shank can pass with a close fit. Such bearing assemblies will be hereinafter referred to as ball and socket joints.

The method of making a ball and socket joint according to the present invention comprises locating an inner member constituting the ball within a cylindrical blank slotted from end to end, compressing axially the cylindrical blank while it is sandwiched between the inner member and a die to form an annular outer member constituting the socket, removing the blank from the die and extending its means circumferential length by an amount sufficient to provide a working clearance between the inner and outer members.

In one method according to the invention the means circumferential length is extended by rolling the outer surface of the blank, for example by rolling the outer surface by rollers spaced around its outer circumference or by rolling the blank between linearly moving roller members.

In an alternative method according to the invention the mean circumferential length of the blank is extended by spacing means adapted to space the edges of the slot apart. In one method at least one of the adjacent edges of the slot may be deformed to provide the said spacing means.

In any case the blank may be formed from a flat strip which is wrapped to form the said cylindrical blank, the flat strip being indented before wrapping in a manner providing a circumferential groove in the cylindrical blank prior to deformation which locates the ball centrally within the socket.

According to another aspect of the present invention a ball and socket joint comprises an inner member constituting the ball having an outer bearing surface in sliding engagement with the inner surface of an outer annular member slotted from end to end, the mean circumferential length of which exceeds that of the ball by an amount sufficient to provide a working clearance between the socket and the ball.

The joint may have a rolled outer member, or spacing means may be and adapted to space the adjacent edges of the slot from one another.

The outer member may comprise an outer layer of ductile material and an inner layer of self lubricating material permanently attached to the outer layer.

Figure 2:
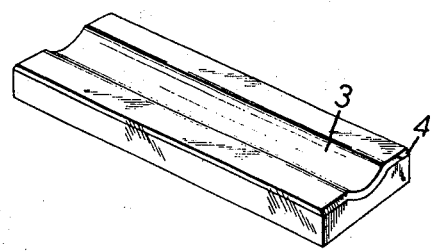
Figure 3:
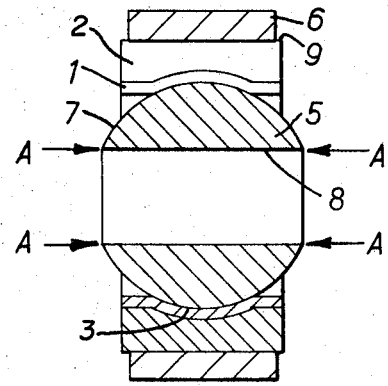
Figure 4:
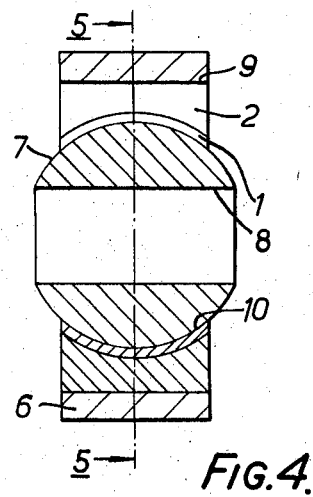
Figure 5:
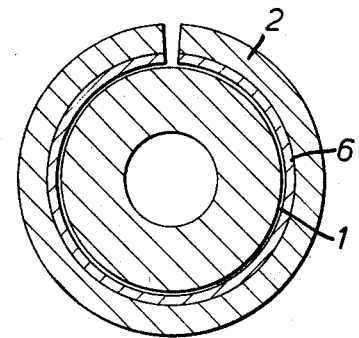
Figure 6:
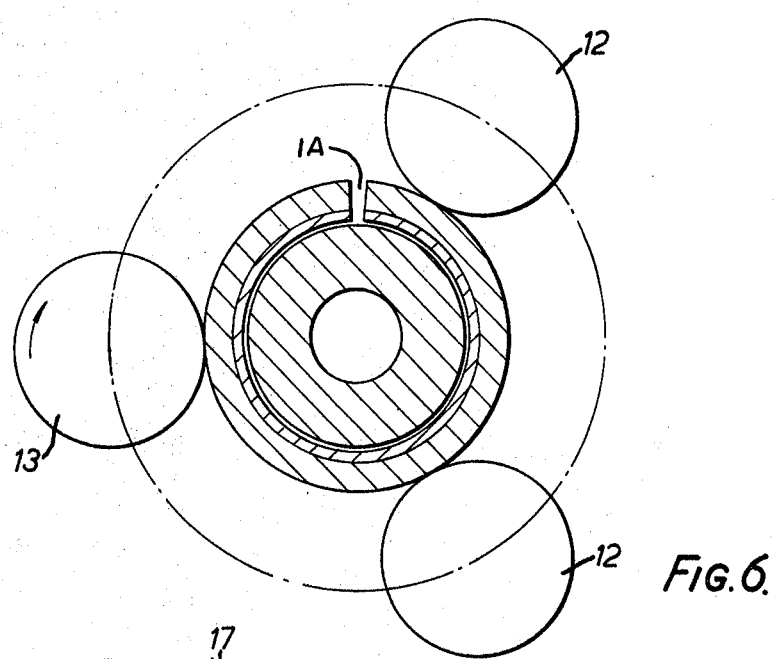
Figure 7:
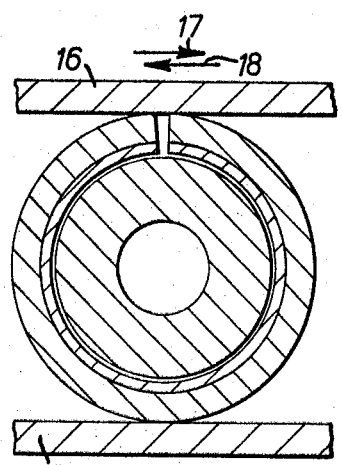
Figure 8:
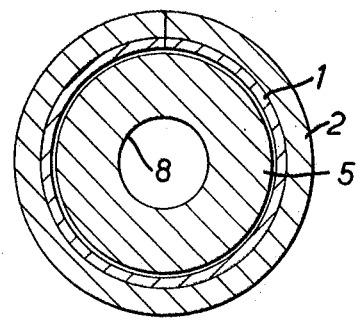
Figure 9:
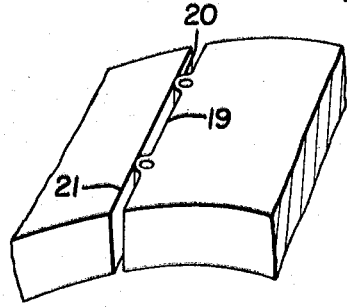

Various examples of the present invention will now be described with reference to the accompanying drawings, in which:

FIG. 1 is a perspective view of one form of strip or blank from which the socket member is formed prior to any deformation taking place, FIG. 2 is a similar view to FIG. 1 of the blank of FIG. 1 upon which an initial forming operation has been performed, FIG. 3 is a view through the blank of FIG. 2 after wrapping has taken place in position in a die and prior to the coining operation, the cross section being taken in a plane containing the axis of the bore through the ball member, FIG. 4 is a similar cross section through the ball and socket joint of FIG. 3 after the coining operation has taken place with the surrounding die still in position, FIG. 5 is a cross section on the line 5—5 of the blank of FIG. 4 showing the position the blank will assume when removed from the die, FIG. 6 is a similar view to FIG. 5 of the blank showing the blank in position between rollers during a rolling operation, FIG. 7 is a similar view to FIG. 6 of the blank showing it in position for rolling by an alternative rolling method, FIG. 8 is a similar view to FIG. 5 of the blank showing the clearance somewhat exaggerated after the blank has been rolled, and FIG. 9 is a perspective view of part of a coined blank showing projections on one side of the two adjacent surfaces of the slot which serve to hold the surfaces apart.

FIG. 1 shows a blank prior to any forming operation which comprises a strip of bearing material 1 formed from a layer of self-lubricating material such as bronze impregnated with P.T.F.E. as for example described in the present applicants' U.S. Pats. Nos. 2,689,380 granted Sept. 21, 1954, and 2,691,814 granted Oct. 19, 1954, or a plastics material as described for example in the present applicants' British patent specification No. 1,015,503 granted Apr. 27, 1966, bonded to a steel or other backing material 2.

FIG. 2 shows the blank of FIG. 1 after an initial forming operation has taken place so that there is a longitudinally extending indentation or groove 3 in its surface 1. Chamfers are provided at 4 which avoid the necessity of removing flashes after the coining operation and also provides a prefinished edge. FIG. 3 shows the blank of FIG. 2 after wrapping (i.e. formed into a cylinder) with a ball member 5 inserted in it and a die 6 surounding the blank prior to the coining operation. FIG. 4 shows the ball and socket joint after the coining operation has taken place. The formed joint comprises a part-spherical outer surface 7 and a bore 8 extending through it to receive a shank or rod in known manner. The outer layer or backing 2 has a cylindrical outer surface 9 while the layer of lining 1 of bearing material has a part-spherical inner surface 10 in close sliding engagement with the spherical surface of the ball 5, the socket member being closely surrounded by the die 6 to the bore of which is the same diameter as the external diameter of the cylindrical surface of the socket member.

During the coining operation the ball is located in the groove 3 in the cylindrical blank as shown in FIG. 3, the die 6 is then fitted around the circumference of the cylindrical blank to prevent its radial expansion and the cylindrical blank then has end pressure applied to it by dies acting on its ends as shown by the arrows A in FIG. 3 so as to deform the blank into the form shown in FIG. 4. This process is generally known as end coining.

The dimensions of the cylindrical blank before the deforming process is chosen so that the volume of material when deformed by plastic flow in the coining operation fills the spaces between the ball and the ends of the die in the manner shown in FIG. 4 while providing the required axial length for the finished socket. After coining and in the position shown in FIG. 4 where the die 6 surounds the coined blank the ball will be a tight fit within the blank and will be difficult, if not impossible, to turn.

FIG. 5 shows the position the blank will occupy when it is removed from the die. The natural resilience of the material from which the blank 1 is formed causes it to spring apart at the axial slot 1A and in this position the required working clearance will be provided. In order to ensure that the working clearance is always present the mean circumferential length of the blank is extended, by an amount sufficient to ensure this is so and FIG. 6 shows an arrangement in which this is effective by inserting the coined blank in between two idler rollers 12 and a driven roller 13. The rollers are brought into contact with the outer periphery of the blank which is then subject to a rolling operation between the rollers which extends its mean circumferential length. The natural resilience of the material is such that the pressure required to be applied by the rollers to roll the blank to extend it is less than that required to cause the axial slot to close up. The rolling operation can thus be conducted until the mean circumferential length of the coined blank has been extended by an amount sufficient to cause the edges of the slot to abut against one another, which has been found to provide the required clearance.

An alternative method of rolling the blank is shown in FIG. 7 in which the blank is rolled between two flat surfaces, the lower flat surface 15 being stationary while the upper flat surface 16 is reciprocated as shown by the direction of the arrows 17 and 18 until the mean circumferential length of the blank has been increased by the required amount to provide the appropriate working clearance.

FIG. 8 shows the form and arrangement of the joint after the rolling operation has been completed and in which it will be seen there is provided a clearance between the ball 5 and the rolled blank, the clearance having been greatly exaggerated for clarity in the figure.

An alternative method of providing the required clearance is shown in FIG. 9 in which instead of rolling the blank after the coining operation has been completed the edge 19 on one side of the axial slot is punched as shown at 20 so as to provide abutments on one side of the slot which bear against the other side of the slot 21 so that the blank is spaced from the ball by the required amount to provide the working clearance.

What we claim as our invention and desire to secure by Letters Patent is:

1. A method of making a ball and socket joint comprising locating an inner member constituting the ball within a cylindrical blank slotted from end to end, compressing axially the cylindrical blank while it is sandwiched between the inner member and a die to form an annular outer member constituting the socket, removing the blank from the the die, and extending its mean circumferential length by rolling the outer surface of the blank for providing a working clearance between the inner and outer members.

2. A method as claimed in claim 1 in which the outer surface of the blank is rolled by rollers spaced around its outer circumference.

3. A method as claimed in claim 1 in which the outer surface of the blank is rolled between linearly moving roller members.

4. A method as claimed in claim 1 in which the mean circumferential length of the blank is extended by spacing means adapted to space the edges of the slot apart.

5. A method as claimed in claim 4 in which at least one of the adjacent edges of the slot is deformed to provide the said spacing means.

6. A method as claimed in claim 1 in which the blank is formed from a flat strip which is wrapped to form the said cylindrical blank, the flat strip being indented before wrapping for providing a circumferential groove in the cylindrical blank prior to deformation for locating the ball centrally within the socket.

References Cited

UNITED STATES PATENTS

| 2,476,728 | 7/1949 | Heim. | |
|---|---|---|---|
| 3,179,477 | 4/1965 | Carter | 308—72 |
| 3,351,999 | 11/1967 | McCloskey | 29—441 X |
| 3,395,436 | 8/1968 | Sullivan. | |

THOMAS H. EAGER, Primary Examiner

U.S. Cl. X.R.

29—441; 287—87; 308—72